United States Patent
Capps

(10) Patent No.: US 6,433,059 B1
(45) Date of Patent: Aug. 13, 2002

(54) METHOD FOR PREPARING BINDER MATERIALS CONTAINING DIISOCYANATES

(75) Inventor: Charles L. Capps, Little Rock, AR (US)

(73) Assignee: Santee, Inc., Pine Bluff, AR (US)

( * ) Notice: Subject to any disclaimer, the term of this patent is extended or adjusted under 35 U.S.C. 154(b) by 0 days.

(21) Appl. No.: 09/420,012

(22) Filed: Oct. 18, 1999

Related U.S. Application Data

(63) Continuation-in-part of application No. 09/189,241, filed on Nov. 11, 1998, now abandoned, which is a continuation-in-part of application No. 08/832,101, filed on Apr. 3, 1997, now abandoned, which is a continuation of application No. 08/620,133, filed on Mar. 21, 1996, now abandoned.

(51) Int. Cl.$^7$ ................... C09J 175/00; C08L 75/00; C08K 3/34; C08K 3/36; C08G 18/08
(52) U.S. Cl. ................... 524/442; 524/589; 524/789; 524/791; 524/839; 528/44; 528/48; 528/67; 528/905
(58) Field of Search ................... 524/442, 589, 524/789, 791, 839; 528/44, 48, 67, 905

(56) References Cited

U.S. PATENT DOCUMENTS

| | | | |
|---|---|---|---|
| 3,747,037 A | 7/1973 | Earing | 336/96 |
| 3,919,173 A | 11/1975 | Coyner et al. | 521/173 |
| 3,923,926 A | 12/1975 | Harada et al. | 528/66 |
| 4,100,328 A | 7/1978 | Gallagher | 428/407 |
| 4,123,412 A | 10/1978 | Fukuda et al. | 524/726 |
| 4,257,995 A | 3/1981 | McLaughlin et al. | 528/51 |
| 4,337,710 A | 7/1982 | Haataja et al. | 108/53.3 |
| 4,377,646 A | 3/1983 | Blount | 521/154 |
| 4,378,441 A | 3/1983 | Blount | 521/154 |
| 4,427,002 A | 1/1984 | Baron et al. | 602/8 |
| 4,525,321 A | 6/1985 | Tonniges | 264/517 |
| 4,609,513 A | 9/1986 | Israel | 264/122 |
| 4,692,292 A | 9/1987 | Kollmeier et al. | 264/126 |
| 4,692,479 A | 9/1987 | Schneider et al. | 523/209 |
| 4,906,484 A | 3/1990 | Lambuth et al. | 428/326 |
| 5,008,359 A | 4/1991 | Hunter | 527/103 |
| 5,053,274 A | 10/1991 | Jonas | 428/332 |
| 5,554,330 A | 9/1996 | Flannery et al. | 264/113 |

OTHER PUBLICATIONS

Sax et al.; *Hawley's Condensed Chemical Dictionary, Eleventh Edition*; Van Nostrand Reinhold; New York; 1987; pp. 1038 and 1039.*

Zhengtian et al, "Technology of Rice Straw Particleboard Bonded By Urea–Formaldehyde Resin Modified by Isocyanate", Nov. 9–13, 1992, pp. 295–302.

* cited by examiner

*Primary Examiner*—Rabon Sergent
(74) *Attorney, Agent, or Firm*—Locke Liddell & Sapp LLP

(57) ABSTRACT

A method for preparing a binder material for cellulosic products which comprises providing a polymeric resin base material preferably comprising 4,4' or 2,4' methylene diphenylene diisocyanate in the range of from about 20% to about 55% by weight and a functionality greater than about 2, forming a colloidal gel from silica and a basic solution, and incorporating the colloidal gel into the polymeric base material at a temperature, rate of addition and agitation level to achieve a substantially homogeneous binder material.

4 Claims, No Drawings

METHOD FOR PREPARING BINDER MATERIALS CONTAINING DIISOCYANATES

RELATED APPLICATIONS

This application is a continuation-in-part of U.S. application Ser. No. 09/189,241, filed Nov. 11, 1998 and entitled "Method For Preparing Binder Materials Containing Diisocyanates", abandoned, which is a continuation-in-part of U.S. application Ser. No. 08/832,101, filed Apr. 3, 1997 and entitled "Bonding of Silica-Rich Plant Particles", abandoned, which is a continuation of U.S. application Ser. No. 08/620,133 filed March 21, 1996 and entitled "Bonding of Silica-Rich Plant Particles", abandoned.

FIELD OF THE INVENTION

This invention relates to the modification of diisocyanate containing materials which results in increased binding capabilities. This invention also relates to the modification of diisocyanate containing materials which results in increased stability of the material. In another aspect, this invention relates to a method for producing a binder material especially suited for use in binding cellulosic materials into useful products such as boards and other construction materials. In a still further aspect, this invention relates to the conversion of cellulosic materials into useful products using a binder prepared by modifying diisocyanate containing materials with silica based compounds.

BACKGROUND

The manufacture of composition board products (sometimes referred to as engineered wood products) has become widespread and commonplace, primarily as a result of efforts to reduce consumption of exhaustible timber. As trees are harvested and millwork ensues, the residual bark, chips and sawdust are used to create board products for consumer applications. Such millwork reclaimed products serve many consumer needs while reducing consumption of exhaustible trees. These products are known as oriented strand boards, chipboards, particle boards and medium and high density fiberboards and are commonly used for (but not limited to) shelving, furniture, flooring, panelling, cabinets, doors, roofing, underlayment and sheathing construction materials.

Composition wood products are ordinarily formed using resins, ureas, phenols and formaldehyde. Often these products must be further processed with laminations and various structural and cosmetic treatments for consumer use and acceptance. While these manufactured products offer economic and conservation advantages and exhibit several characteristics of solid wood products, they are generally limited in application and are formed using chemical binders with undesirable and adverse environmental and health impacts. Furthermore, most technologies associated with formation of engineered wood products require reduction of wood to usable fiber form; employ wet chemistries; and require high temperatures and high pressures. Thus they require high energy consumption and raise environmental issues relating to disposal of process wastes and waste water reclamation and clarification.

Current U.S. consumption of adhesive resin solids to bond primary glued wood products exceeds 1.25 million metric tons. Approximately 50% of this volume comprises urea-formaldehyde (UF) resin; 45% comprises phenol-formaldehyde (PF) resins; with the balance distributed to synthetics. The industry has historically relied on UF and PF resins due to consideration of lower cost, experience, and performance. However, continuing environmental factors are now prompting new adhesive developments to provide safer, low emission products with high bonding performance. The synthetics, mainly polyvinyl acetates and polymeric MDI have gained acceptance but are still not cost competitive and contain some volatile monomers. It should be noted that MDI is preferred in industrial practices to TDI, HDI, NDI, and their derivatives, MDI being less volatile.

Methods to manufacture isocyanates have been known since the late 1800's. Early investigations converted highly volatile cyanic acids to isocyanates. Cyanic acid is highly polymeric and hydrolyses in water to form ammonia and carbon dioxide. The salts and esters of its isomer are isocyanates. In these early methods, primarily the Curtius, Lossen, and Hoffman, commercial production was prohibitive due to instability hazards, reaction limitations of aliphatic isocyanates (since aromatic isocyanates react with water), and cost of process. These methods can be described as:

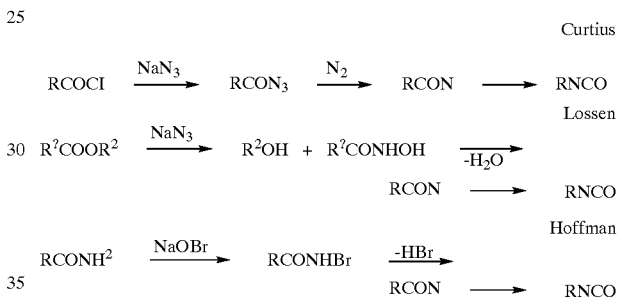

The commercially viable method to produce isocyanates relies on phosgenation of a primary amine, developed by Hentschel in 1884. This method to produce isocyanates, both aromatic and aliphatic, can be described as:

Isocyanates were initially used to produce herbicides and insecticides from their associated carbamates and substituted areas. As development progressed, addition of aromatic and aliphatic compounds resulted in diisocyanates, substances exhibiting polymeric properties conducive to elastomeric urethane products. These compounds and their derivatives, based on toluene, phenylmethane, naphthalene, and hexamethylene, (respectively TDI, MDI, NDI, and HDI) vary widely in properties, toxic hazards, and volatilities. Included in the range of products from these diisocyanates are thermoplastics, foams, fiber forming polymers, coatings, and adhesives. These derivatives in pure form yield products where maximum linear strength is desirable. However, some are subject to reduction of binding capability (e.g., adhesive bonding strength), wherein storage life and ambient temperatures cause decomposition of the diisocyanate. This reaction is commonly referred to as dimerization and can be depicted as:

The loss of binding capability is dependent upon varying rates of reaction of the respective diisocyanates to polymerize.

The current practical method to avoid excessive dimerization has been to reduce the purity of a diisocyanate. As an example, MDI is produced from aniline (phenylamine) and formaldehyde, reacted together with hydrochloric acid as a catalyst. This condensation is then followed by phosgenation:

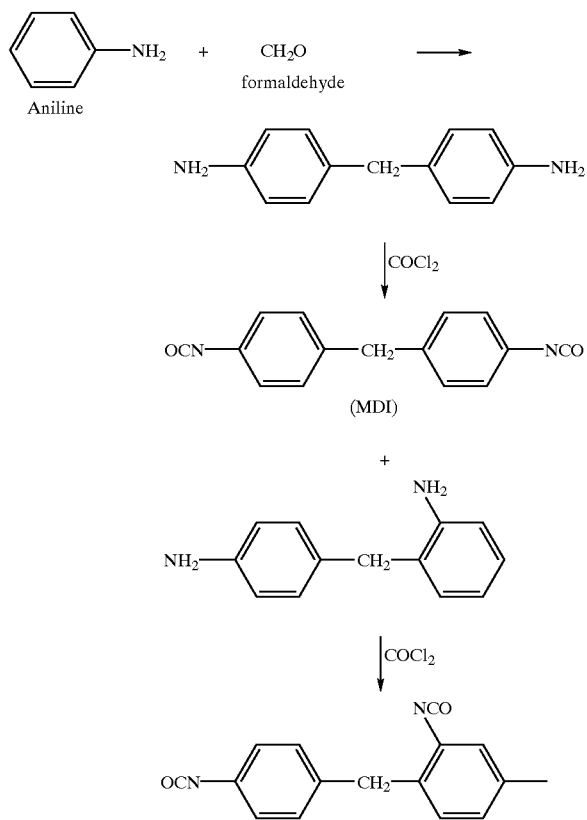

Dependent upon the ratio of reactants and distillation of the existing MDI for purity, consecutive phosgenation of numerous polyamines produce a crude liquid containing diisocyanates, triisocyantes, and polyisocyanates. However, the resultant liquid isomer, although more stable than pure MDI, suffers loss of strength from the presence of these impurities.

SUMMARY OF INVENTION

This invention relates to the modification of TDI, MDI, HDI, NDI, and any derivatives thereof. More particularly, it relates to a method of incorporating derivatives of silicon into resin blends including but not limited to any variety of diisocyanates associated with prepolymeric or polymeric materials, polyols, and polyisocyanates to increase adhesive bond strength potential. Additionally, as the silicon content is increased, the modified resin is increasingly tolerant to dilution by water wherein adhesive bond strength potential is extended to produce suitable product for commercial applications at low cost.

The invention includes a method for preparing a binder material for cellulosic products which comprises providing a polymeric resin base material preferably comprising 4,4' or 2,4' methylene diisocyanate diphenylene in the range of from about 20% to about 55% by weight and a functionality greater than about 2, forming a colloidal gel from silica and a basic solution, and incorporating the colloidal gel into the polymeric base material at a temperature, rate of addition and agitation level to achieve a substantially homogeneous binder material. The preferred polymeric resin base material is PAPI or similar diisocyanate containing polymeric by-products obtained as a result of the manufacture of MDI. The colloidal gel is preferably formed by addition of an aqueous solution of an alkali metal hydroxide to solid silica. The amount of colloidal silica incorporated into the polymeric base resin is preferably in the range of from about 40% to about 60% of the molecular weight of the NCO content of the base polymer.

In another aspect, the invention relates to a method for increasing the binding capability and/or stability of diisocyanate containing polymeric resins, some of which have heretofore been considered by-products of no, or limited, utility in the bonding of cellulosic products. By modifying such compositions with silica based materials a new binder material is formed which displays enhanced binding capabilities and stability as compared to the unmodified base resin material. Such new binders can be further diluted with water and used to economically produce bonded cellulosic structures useful in a wide range of applications.

The invention also relates to preparing structural shaped articles, including boards, from cellulosic materials (for example, wood fibers) using wet or dry processes wherein the binder material is prepared as described above. The resulting products have excellent physical properties and can be produced at a substantially lower cost than similar products made using conventional binders.

DETAILED DESCRIPTION

The starting materials for the method and binder of the present invention include a diisocyanate containing base polymer resin. The base resin is normally a fairly viscous material at ambient conditions. It normally comprises a variety of diisocyanates, prepolymers and polymeric materials. The base resins are normally insoluble in water and water cannot be incorporated into the base resins in any substantial amount prior to the modification procedures described herein below. While the base resin material may have some binding capability, that capacity, combined with the inability to dilute the resin with water limits the utility of the base resin. Further, the base resins used herein are relatively unstable and will degrade over time causing relatively short shelf lives. By modifying such base resin materials with silica compounds in accordance with the method of the invention, water can be incorporated into the resins, binding capabilities are enhanced and stability can be controlled.

The modification of the base resin material results in a reduction of the weight % NCO groups present in the base resin. It is thought that the reduction of NCO by hydrolysis in the presence of a salt creates CH and CHO groups which then act to polymerize oligomers, monomers and polymeric isocyanates in the base resin. It is preferred to reduce the NCO content of the base resin materials to a range of from about 4 to about 6% by weight.

In a preferred embodiment of the invention, the base resin has a "functionality" (see comment below regarding definition of this term as it relates to these types of materials) greater than about 2, and a content of 4,4' or 2,4' MDI in the range of from about 20% to 55% by weight in a blend of polymeric materials wherein the balance in polymeric materials is represented as n =3, 4, and 5 in decreasing amounts as 100% solids:

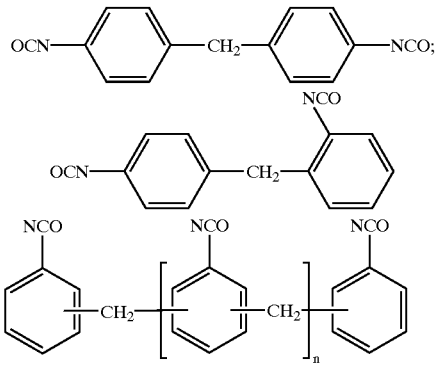

PAPI, ("PAPI" is a trademark of Dow Chemical Company) a commercially available material produced as a by-product during production of MDI, is a particularly preferred base resin material. PAPI 27 is especially preferred and it has a typical molecular weight of about 340, a "Functionality" of 2.7, ( Dow indicates in its literature that the term "functionality" as used in connection with PAPI is not true functionality but typifies expected cross-link densities in end use and an isocyanate equivalent weight % of 134.0. The NCO content by weight of PAPI 27 is 31.4; its viscosity at 25° C. is 150–220 cps/mo. It has a vapor pressure of less than $10^{-5}$ (mm Hg at 25° C.) and a density of 1.23 (g/ml) at 25° C. It has been discovered that PAPI can be modified in accordance with the present invention to provide a binder material that has excellent and highly economic benefits in the production of cellulosic based construction materials such as particle board and the like.

PAPI, and other similar base resin materials can be modified in accordance with the method of the present invention to impart desirable properties of strength and storage time. It is known that various soluble forms of the chemical element silicon have polymeric and adhesive properties. Silicon forms positive ion, covalent bonds. Silicon is not allotropic, its diamond structure having an atom surrounded tetrahedrally by four others to which it is covalently bonded. In silicon dioxide, the silicon atom is covalently bonded to four oxygen atoms, the interconnected (by oxygen) tetrahedra thus forming a three dimensional system. This structural propensity is even known to occur in microcrystalline forms of silicon, i.e., when combustion of silane is caused.

Solubilized or hydrated silicon is known as silicic acid. Generally, these acids exist as $H_4SiO_4$ (ortho); $H_2SiO_3$ (meta); or disilicic, trisilicic, etc., acids with a higher degree of hydration. However, quartz and other silica forms react slightly with water to form monosilicic acid as:

$(SiO_2)$ n $+2nH_2O \rightarrow nSi\,(OH)_4$

This reaction is a depolymerization followed by a hydrolysis. In reverse reaction, the more complex silicic acids are thought to form by polymerization of $Si(OH)_4$ molecules. The chain extension is accomplished by the sharing of -OH ions between two silicon ions (octahedrally coordinated by six hydroxyl ions). Ensuing condensation then follows with the loss of water to produce —Si-O-Si—linkages. This polymerization of a silicic acid results in a stable sol of colloidal particles, or gel. Affection of the silicic acid with acid or alkali catalysts and pH control of the sol establish efficiencies of absorption/dehydration and/or degrees of polymerization. Additionally, as polymerization ensues to produce these linkages, the introduction of cations such as sodium, $Na^+$, potassium, $K^+$, calcium, $Ca^{2+}$, etc., create interstitial bonds, thus causing greater cohesive properties.

Preparation of the silica based colloidal gel material useful in the invention can be effected by addition of a suitable basic solution, including akali metal hydoxide solutions to solid forms of silica. Fumed silica is preferred. In general a pH of from about 8.0 to about 11.5 should be maintained. The resulting colloidal gel can be incorporated into the base resin as discussed below.

It has been discovered that graduated incorporation of silica, for example by careful addition of a colloidal gel, to the diisocyanate containing base resins described above results in a substantially homogeneous binder material of increased binding capapbility and stability. The base resin materials themselves do not mix with or take up water. Too rapid addition of silica containing solutions will not result in a homogeneous binder as the silica phase and the base resin phase will not fully combine. However, by controlling the ratios, parameters and conditions under which the materials are added to one another, a homogeneous binder material can be obtained. In general, the parameters which can be controlled include temperature, rate of addition and shear imparted during the mixing process.

In the preferred method graduated incorporation of the compounds to the diisocyanate blend should be practiced not to exceed 10% per minute of addition of solids to the known content of NCO molecules. For example, a resin blend known to contain 47% MDI has a total % NCO content of 31.3% by molecular weight. Addition of the sodium and silicon solids by molecular weight should not exceed 10% per minute incorporation to the total resin blend. Upon addition of the sodium and silicon solids to a level equivalent 40% to 60% molecular weight of the NCO content, addition of the compounds are terminated.

Mixing of the materials must also be controlled. If too little shear is imparted to the materials as they are combined, the silica gel will not be incorporated into the polymeric resin to form a homogenous material. On the other hand, if too much shear is imparted during combination, clear phase separation can occur. In the experiments run to date, the introduction of the compounds is accompanied by continuous mixing of the polymeric materials preferably at speeds no less than 120 rpm and no greater than 300 rpm. The rpm values are established to achieve a thorough incorporation of the compounds yet avoid breakdown by higher shear when silica gel is utilized. When silica gel is utilized lower speeds are preferred, however, it is noted that rpm values higher than 300 may exist when silicate solutions are incorporated without regard to separation phasing of colloidal gel sols.

The general method of the invention can be better understood by reference to the procedures and materials which could be used to produce about one pound of the binder material of the present invention. Thus, a preferred base resin material in the form of PAPI is provided in an amount of approximately 84 grams. A colloidal gel is prepared from about 1.3 grams of solid silica mixed with about 4.7 grams of a 50% solution NaOH (containing approximately 37% by weight NaOH). The colloidal gel, which comprises $Si_xO_y$, should preferably not be diluted below about 40% by weight solids prior to addition to the base resin material. The materials are then combined, the rate of addition, temperature and shear conditions being controlled so that they form a substantially homogeneous mixture. Once formed, the homogeneous mixture can be further diluted with water in an amount of about 372 grams to form approximately 1 pound of binder material.

In aid of further understanding of the method of the present invention the following exemplary preparations are set forth:

PREPARATION 1

100 grams of PAPI 100% solids with an overall functionality of 2.7 was staged in a one liter beaker fitted with a feed tube. A teflon-covered magnetic stir bar, 7/8"×5/16" was placed in the beaker, and the beaker placed on a variable speed stirrer and activated at 150 rpm. Viscosity at 25° C. of the PAPI measured 165 cP. To 100 ml of a 5% aqueous solution of sodium hydroxide in a graduated cylinder, 2 grams of fumed silica were added and stirred until a colloidal gel was formed. The corresponding end of the feed tube from the beaker containing the PAPI was connected to the outflow of a metering pump. A tube was connected to the inflow fitting and then inserted into the cylinder of gel. The metering pump was then calibrated to flow at a rate by weight of total solids to the PAPI approximately 9% per minute. The pump was activated for a period of 5 minutes and halted, the stirring maintained for approximately 1 minute. Viscosity of the converted PAPI measured 185 cP.

PREPARATION 2 100 grams of PAPI 100% solids with an overall functionality of 2.7 was staged in a one liter breaker. A teflon-covered magnetic stir bar, 7/8"×5/16" was placed in the beaker, and the beaker placed on a variable speed stirrer and activated at 150 rpm. Viscosity at 25° C. of the PAPI measured 165 cP. A metering pump then introduced a 4% solution of sodium hydroxysilicate to the PAPI at a rate equal to 9% addition to total solids per minute for 5 minutes. The flow was then ceased and the stirring continued for approximately 1 minute. Viscosity of the converted PAPI measured 180 cP.

Experiment 1

PAPI versus Silica Substituted PAPI

The intent of this experiment is to determine the extent, if any, of bonding effects when a polymeric MDI is altered. Specifically, it is believed that a specific form of a silica compound in accordance with the present invention replaces isocyanate molecules; that in the process of this substitution, complex polyureas are formed; and, the resultant mixture contains superior stability and bonding effects. The new compound, now containing a high level of water and having reacted with the isocyanate molecules, is the subject of comparison with PAPI without any alteration.

Rice hulls for all samples were supplied in what is known as a 16/80 grind. The hulls were analyzed for moisture content and moisture was adjusted with the addition of water to contain 8% by weight moisture. Two master batches were then measured. In Batch "A", 3.0% of PAPI by solids weight to dry weight fiber was introduced and blended in an industrial Hobart mixer. In Batch "B", 3.0% of the converted PAPI by solids weight to dry weight fiber was introduced and blended in an industrial Hobart mixer.

Two additional master batches were created exactly as described above with the exception of concentrations of PAPI and converted PAPI being 4.0% and 5.0%. All master batches were then stored in separate containers to preserve their integrity until boardmaking ensued.

Measured amounts of furnish were then taken from each master batch. Six individual mats of equal weight were made for each master to insure consistencies of physical property results, for a total of 36 samples.

To make all boards, a Carver hydraulic press with heated 6"×6" platens was used. Temperature was set to 300° F. Applied pressures were set to 200psi, 250psi, and 300psi, the variance used to affect board densities (see Tables 1–9). Dwell time was standardized to four minutes after press closure.

After removal and cooling of each board, each board was then trimmed to measure 4"×4", weighed and measured to calculate density, and then compiled to be tested for Modules of Rupture (MOR) and Modules of Elasticity (MOE).

MOR is an index of the ultimate breaking strength of the board when loaded as a simple beam. MOE is a measure of the board's resistance to deflection or sagging when loaded as a simple beam.

TABLE 1

Comparison of Board Samples:
16/80 Ground Rice Hulls PAPI versus Converted PAPI:
3.0% solids weight to DWF

|  | PAPI | Converted PAPI |
| --- | --- | --- |
| Avg. Furnish Weight | 125 g | 125 g |
| Avg. Board Thickness | No bonding; all samples resulted in dry loose mat | 0.25" |
| Avg Density | No bonding; all samples resulted in dry loose mat | 48 lbs cu ft |
| Avg. MOR | No bonding; all samples resulted in dry loose mat | 2240 psi |
| Avg. MOE | No bonding; all samples resulted in dry loose mat | 375 psi × 1000 |

TABLE 2

Comparison of Board Samples:
16/80 Ground Rice Hulls PAPI versus Converted PAPI:
4.0% solids weight to DWF

|  | PAPI | Converted PAPI |
| --- | --- | --- |
| Avg. Furnish Weight | 125 g | 125 g |
| Avg. Board Thickness | No bonding; limited aggregate | 0.25" |
| Avg Density | No bonding; limited aggregate | 54 lbs cu ft |
| Avg. MOR | No bonding; limited aggregate | 3030 psi |
| Avg. MOE | No bonding; limited aggregate | 488 psi × 1000 |

TABLE 3

Comparison of Board Samples:
16/80 Ground Rice Hulls PAPI versus Converted PAPI:
5.0% solids weight to DWF

|  | PAPI | Converted PAPI |
| --- | --- | --- |
| Avg. Furnish Weight | 125 g | 125 g |
| Avg. Board Thickness | Some bonding with total delamination. Some aggregate destructible with hand compression | 0.25" |
| Avg Density | Some bonding with total delamination. Some aggregate destructible with hand compression | 60 lbs cu ft |

TABLE 3-continued

Comparison of Board Samples:
16/80 Ground Rice Hulls PAPI versus Converted PAPI:
5.0% solids weight to DWF

|  | PAPI | Converted PAPI |
|---|---|---|
| Avg. MOR | Some bonding with total delamination. Some aggregate destructible with hand compression | 4710 psi |
| Avg. MOE | Some bonding with total delamination. Some aggregate destructible with hand compression | 530 psi × 1000 |

TABLE 4

Comparison of Board Samples:
16/80 Ground Rice Hulls PAPI versus Converted PAPI:
3.0% solids weight to DWF

|  | PAPI | Converted PAPI |
|---|---|---|
| Avg. Furnish Weight | 200 g | 200 g |
| Avg. Board Thickness | No bonding; some small aggregates | 0.5" |
| Avg Density | No bonding; some small aggregates | 51 lbs cu ft |
| Avg. MOR | No bonding; some small aggregates | 4300 psi |
| Avg. MOE | No bonding; some small aggregates | 420 psi × 1000 |

TABLE 5

Comparison of Board Samples:
16/80 Ground Rice Hulls PAPI versus Converted PAPI:
4.0% solids weight to DWF

|  | PAPI | Converted PAPI |
|---|---|---|
| Avg. Furnish Weight | 200 g | 200 g |
| Avg. Board Thickness | No bonding; larger aggregates | 0.5" |
| Avg Density | No bonding; larger aggregates | 57 lbs cu ft |
| Avg. MOR | No bonding; larger aggregates | 4600 psi |
| Avg. MOE | No bonding; larger aggregates | 550 psi × 1000 |

TABLE 6

Comparison of Board Samples:
16/80 Ground Rice Hulls PAPI versus Converted PAPI:
5.0% solids weight to DWF

|  | PAPI | Converted PAPI |
|---|---|---|
| Avg. Furnish Weight | 200 g | 200 g |
| Avg. Board Thickness | Some bonding but boards will crumble | 0.5" |
| Avg Density | Some bonding but boards will crumble | 63 lbs cu ft |
| Avg. MOR | Some bonding but boards will crumble | 5300 psi |
| Avg. MOE | Some bonding but boards will crumble | 620 psi × 1000 |

TABLE 7

Comparison of Board Samples:
16/80 Ground Rice Hulls PAPI versus Converted PAPI:
3.0% solids weight to DWF

|  | PAPI | Converted PAPI |
|---|---|---|
| Avg. Furnish Weight | 250 g | 250 g |
| Avg. Board Thickness | No bonding; some formed, crumbly aggregates | 0.625" |
| Avg Density | No bonding; some formed, crumbly aggregates | 53 lbs cu ft |
| Avg. MOR | No bonding; some formed, crumbly aggregates | 6600 psi |
| Avg. MOE | No bonding; some formed, crumbly aggregates | 510 psi × 1000 |

TABLE 8

Comparison of Board Samples:
16/80 Ground Rice Hulls PAPI versus Converted PAPI:
4.0% solids weight to DWF

|  | PAPI | Converted PAPI |
|---|---|---|
| Avg. Furnish Weight | 250 g | 250 g |
| Avg. Board Thickness | Larger aggregates with some density and bonding | 0.625" |
| Avg Density | Larger aggregates with some density and bonding | 69 lbs cu ft |
| Avg. MOR | Larger aggregates with some density and bonding | 6700 psi |
| Avg. MOE | Larger aggregates with some density and bonding | 600 psi × 1000 |

TABLE 9

Comparison of Board Samples:
16/80 Ground Rice Hulls PAPI versus Converted PAPI:
5.0% solids weight to DWF

|  | PAPI | Converted PAPI |
|---|---|---|
| Avg. Furnish Weight | 250 g | 250 g |
| Avg. Board Thickness | 0.76 | 0.625" |
| Avg Density | <30 lbs cu ft | 64 lbs cu ft |
| Avg. MOR | Boards retained form after removal from press but delaminated | 7100 psi |
| Avg. MOE | Boards retained form after removal from press but delaminated | 7700 psi × 1000 |

Experiment 2

PAPI versus Converted PAPI

In accordance with the present invention, a polymeric isocyanate may be converted by means of adding a suitable silicic compound to to the polymeric compound. The result of this conversion allows for the addition of water to the newly formed compound while increasing its adhesive performance. MDI is known to be highly reactive with water, which then diminishes its ability to act as an adhesive. With the addition of the silicic compound solution, the isocyanate molecules are reacted, and the substituted silica molecules then displace most of the reacted NCO groups. Since a number of byproducts result from this chemical reaction, including the formation of polyureas, the resultant mixture thus exhibits increased performance of adhesion under certain conditions. The following experiment, demonstrates this increased performance when compared to the adhesion characteristics of an MDI containing substance known as PAPI:

125 grams of 20/80 ground rice hulls are measured and placed in a mixing vessel. To this, a calculation is made to incorporate 4% of converted PAPI to this furnish. The converted PAPI is know to contain 20% solids, therefore a total weight of 25 grams is added to the furnish (125 * .04/.20). Total weight of solids to DWF is 5 grams.

125 grams of 20/80 ground rice hulls are measured and placed in another mixing vessel. To this, a calculation is made to incorporate 4% of PAPI to this furnish. Since the PAPI is 100% solids, 5.0 grams are added to the furnish. Since the converted PAPI contains 20 grams of water, an addition of water is made to the furnish with 100% PAPI.

Boardmaking with Converted PAPI

A mat is formed on a bottom caul plate and a top plate is added. This is now placed into a Carver 6"×6" press which has been heated to 300° F. The press is then closed and an applied pressure of 200psi is held for four minutes. While in the press, no migration or leaching from the edges of the mat is noticed and steam release is slight and infrequent.

The pressure is released and the resultant board is cooled. Both sides of the board have a sheen and the thickness after trimming is 0.25". Based upon weight and dimension, the density of the board appears to be 49.17 pcf.

Boardmaking with 100% PAPI with Water Addition

A mat was formed with the exact procedure as described above. The mat was introduced to the Carver press, heated at 300° F. 200 psi of applied pressure was then held for four minutes. During the pressing, steam, sputtering water, and what is believed to be PAPI, continually leached from the mat. After approximately 1.5 minutes, violent releases occurred. Since the reaction was so pronounced, a careful release of applied pressure was conducted to avoid an explosion from any internal gas pressure. However, upon reaching approximately 115 psi, an abrupt release of gas and ground rice hulls occurred, leaving a quantity of wet, hot fiber in and around the press.

In order of reactivity, the most important substances to react with isocyanates are polyols, water, and amines. The reactions with water are highly complicated. The initial reaction is usually unstable and may be depicted as:

More specifically, the reaction and subsequent products appear to be:

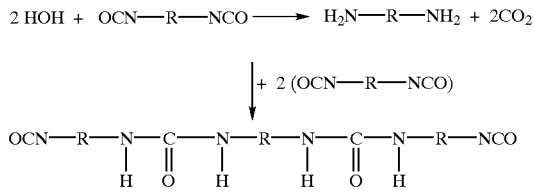

wherein, carbon dioxide and amines are formed. The resultant amine then tends to react at a faster rate than water and yields a disubstituted urea, depicted as:

wherein, 1 mole of water consumes two equivalents of isocyanate, producing 1 mole of carbon dioxide.

As described in PREPARATION 1, an amount of famed silica known as CAB-O-SIL* (registered trademark of the Cabot Corporation) was incorporated to a solution of sodium hydroxide. This form of silica was selected due to its fine particulate size and, when dispersed in water, produces a branched chain aggregate colloid. Bulk density of the uncompressed aggregate is known to be approximately 2.5 pounds per cubic foot. The surface chemistry of the fumed silica contains isolated hydroxyls, hydrogen bonded hydroxyl groups, and siloxane groups. On average, 3.5 to 4.5 hydroxyl groups exist per nanometer of silica surface. The hydroxyl groups are hydrophilic while the siloxane groups are hydrophobic. The hydroxyl groups form hydrogen bonds between the aggregates, thus creating a network when dispersed in a liquid system pH less than 10.7, thus increasing viscosity. The network of silica is of a degree to cause high reinforcement of fluid systems, having increased the cohesive strength of solids within. Additionally, as polymerization occurs, ring siloxanes are believed to form, thus augmenting the structure. In PREPARATION 2, the hydroxysilicate solution is comprised of silicate particulates sharing -OH ions between silicon ions. When introduced to a diisocyanate, the earlier mentioned reactions with water cause a loss of water resulting in condensation and polymerization of —Si-O-Si—linkages, creating a networking to create viscosity with reinforcing bonds. Furthermore, the presence of the Na+ and OH- ions are believed to interstitially bound within the —Si-O-Si—matrices.

Without being bound by any theories, it is believed that several phenomena occur to result in a complex and crosslinked bonding of cellulosic materials with the binder described herein. For example, it is believed that diisocyanates, (such as 4,4' methylene diphenyl diisocyanate or 2,4' methylene diphenyl diisocyanate) are catalyzed by the presence of the silicic anhydride which has been converted to silicic acid by association with water molecules. This reaction may be represented as:

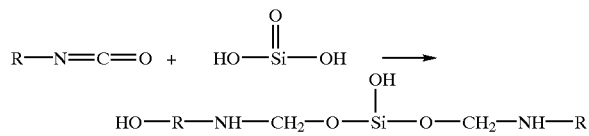

Since the above catalysis occurs in the presence of cellulosic fibers high in open end hydroxyls, it is believed that a reaction occurs which may be represented as:

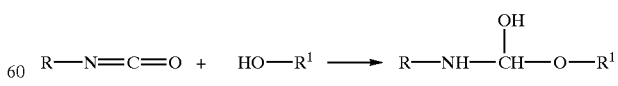

wherein
R is one half of a diisocyanate compound and
R' is cellulose.

These reactions are believed to result in formation of a backbone created by hydrated amorphous silica wherein the resultant acid catalyzes the diisocyanate prepolymer with linking occurring at open end hydroxyls and the diisocyanate then linking to the cellulosic content.

Diisocyanates are known to be cyclic crosslinking compounds with methyl groups. It is believed that the reaction thus forms an organosilicon hydroxide polymer complex with extensive bonding occurring at OH, O and C sites. It is further believed the reaction is caused by acid catalysis of the diisocyanate prepolymer, thus initiating a chain reaction with $SiO_2$ molecules in situ with cellulose to form bonds of a superior nature.

Additionally, it is known that vicinal hydrogen bonding occurs among cellulosic fibers as well as Van der Waals effects to promote cellulosic bonding. It is believed that these multiple associations and bondings serve to create strength and integrity of the product formed. Thus the process of the invention may be used to form solid product from most any cellulosic material.

It will readily recognized that the invention is not limited to formation of board products. Instead, the appropriate mixture of components can be formed in any suitable mold shape to form shaped bodies. Furthermore, the mixture can also be heated and formed into a unitary body by extrusion and the like.

While the invention has been described with particular reference to specific embodiments thereof, it is to be understood that the forms of the invention shown and described in detail are to be taken as preferred embodiments thereof. Various changes and modifications may be resorted to without departing from the spirit and scope of the invention as defined by the appended claims.

What is claimed:

1. A method for preparing a binder material for cellulosic products comprising:

a) providing a polymeric resin base material comprising 4,4' or 2,4' methylene diphenylene diisocyanate in the range of from about 20% to about 55% by weight and an isocyanate functionality greater than 2, wherein said polymeric base resin material contains isocyanate polymeric by-products obtained as a result of the manufacture of MDI and incorporates oligomers of the diisocyanate;

b) forming a colloidal silica from silica and a basic solution;

c) incorporating the colloidal silica into said polymeric base material at a temperature, rate of addition and agitation level to achieve a substantially homogeneous cellulosic binder material.

2. The process of claim 1 wherein said colloidal silica is formed by addition of an aqueous solution of an alkali metal hydroxide to solid silica.

3. The process of claim 1 and further comprising diluting the resulting binder material with water.

4. The process of claim 1 wherein the amount of colloidal silica incorporated into the polymeric base resin is in the range of from about 40% to about 60% of the NCO content of the base polymer.

* * * * *